(12) United States Patent  (10) Patent No.: US 7,859,557 B2
Fluck  (45) Date of Patent: Dec. 28, 2010

| (54) | METHOD AND APPARATUS FOR RECORDING DIGITAL DATA ON IMAGE-RECEIVING MEDIUM |
|---|---|
| (75) | Inventor: Daniel Fluck, Embrach (CH) |
| (73) | Assignee: Pro Archive AG, Uitikon (CH) |
| ( * ) | Notice: Subject to any disclaimer, the term of this patent is extended or adjusted under 35 U.S.C. 154(b) by 783 days. |
| (21) | Appl. No.: 11/667,576 |
| (22) | PCT Filed: Nov. 3, 2005 |
| (86) | PCT No.: PCT/CH2005/000643<br>§ 371 (c)(1),<br>(2), (4) Date: May 11, 2007 |
| (87) | PCT Pub. No.: WO2006/050623<br>PCT Pub. Date: May 18, 2006 |
| (65) | Prior Publication Data<br>US 2007/0296983 A1   Dec. 27, 2007 |
| (30) | Foreign Application Priority Data<br>Nov. 11, 2004   (CH)  .................... 1858/04 |
| (51) | Int. Cl.<br>*B41J 2/435*   (2006.01)<br>*B41J 2/47*   (2006.01) |
| (52) | U.S. Cl. .............. 347/234; 347/248 |
| (58) | Field of Classification Search .......... 347/229, 347/234, 235, 238, 248–250<br>See application file for complete search history. |
| (56) | References Cited |

U.S. PATENT DOCUMENTS 5,315,322 A   5/1994   Bannai
5,541,637 A   7/1996   Ohashi et al.
5,576,852 A   11/1996  Sawada et al.
5,850,248 A * 12/1998  Bellemore .............. 347/262
5,932,394 A * 8/1999   Van Hunsel et al. ........ 430/302
6,175,666 B1  1/2001   Yoshida
6,346,992 B2 * 2/2002  Melzer et al. ............. 358/1.5
2001/0012042 A1 8/2001 Sugunuma
2002/0101502 A1 8/2002 Sugunuma

FOREIGN PATENT DOCUMENTS

| EP | 0 565 335 | 10/1993 |
| JP | 61019278 | 1/1986 |
| JP | 2001213007 | 8/2001 |
| JP | 2001228619 | 8/2001 |
| JP | 2001245485 | 9/2001 |
| WO | WO-0213511 A1 | 2/2002 |

\* cited by examiner

*Primary Examiner*—Hai C Pham
(74) *Attorney, Agent, or Firm*—Marshall, Gerstein & Borun LLP

(57) ABSTRACT

The invention relates to a method and apparatus for recording digital data on an image-receiving medium (20). The recording head (71) is transported along a slow-scan-direction (Y) and digital image data is recorded along a fast-scan-direction (X). The recording head (71) is decoupled from its drive (60) during recording of digital image data of a line or an image or part of it. The transient movement of the recording head (71) along the fast-scan-direction (X) is detected before and/or during exposure using a sensor system (52, 53) and these signals are used to derive a high precision synchronized clock by suitable interpolation and/or extrapolation for the recording of image data to the image-receiving medium (20).

31 Claims, 10 Drawing Sheets

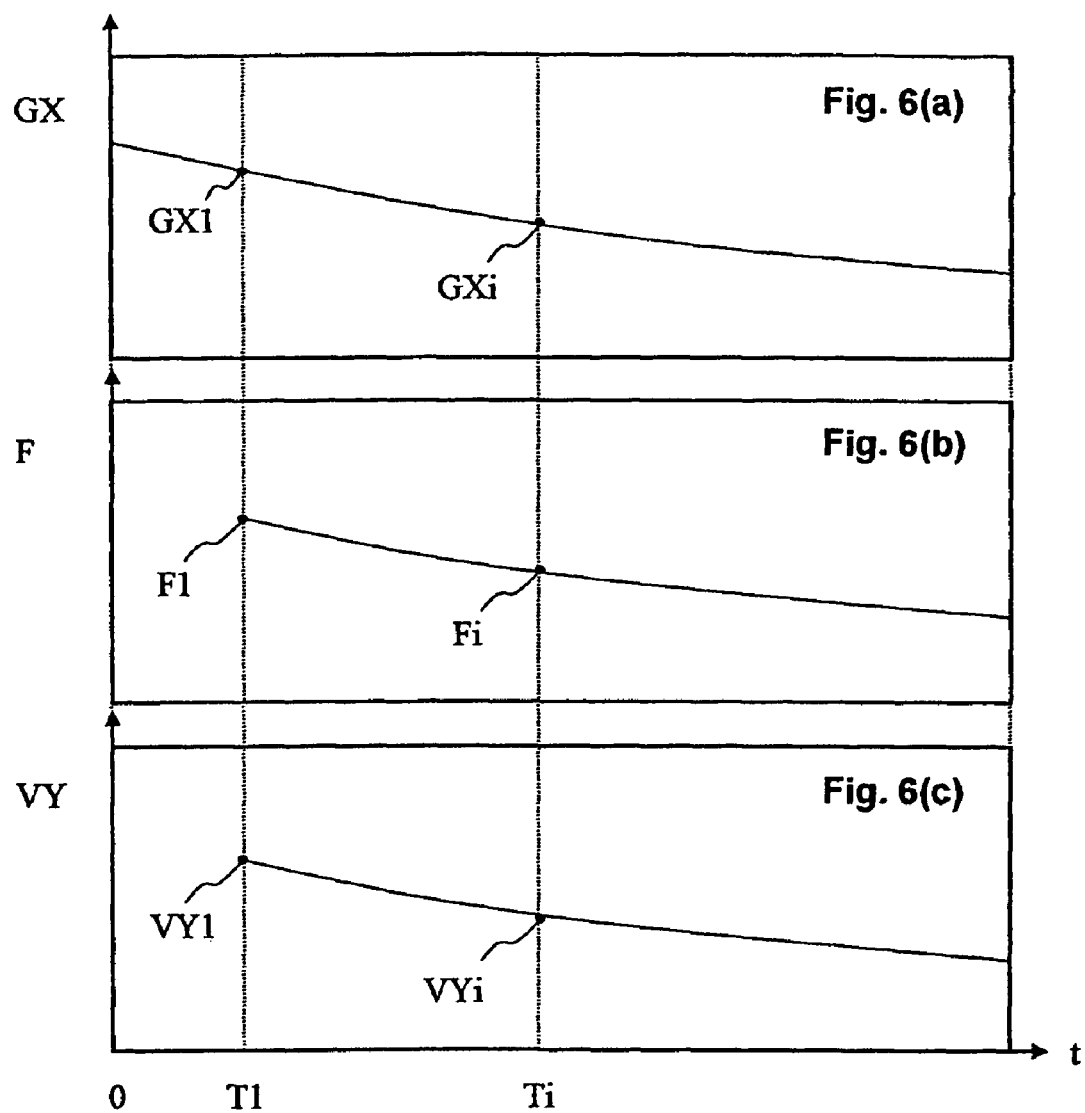

METHOD AND APPARATUS FOR RECORDING DIGITAL DATA ON IMAGE-RECEIVING MEDIUM

FIELD OF THE INVENTION

The present invention relates to a method and apparatus for recording digital data on an image-receiving medium according to the preambles of the independent claims.

BACKGROUND OF THE INVENTION

Devices for the recording of digital image data to an image-receiving medium are known, such as the documents WO 02/13511, U.S. Pat. No. 5,315,322, U.S. Pat. No. 6,175,666, JP 2OO1213007, 2OO1228619, JP 2OO1245485 or JP 61019278.

The apparatus of the preamble typically comprises a memory, which is able to store and retrieve the complete image data without gaps and at the required data rate, and a printing head, which records fed image data via a controlled motion device along two directions in defined and precise order onto the image-receiving medium. The image-receiving medium can be, for example, a photosensitive material, paper, special foil, printing plate or the like. To ensure that the physical image on the image material is generated completely with all applied pixels in its original quality, the movement of the recording head along the two axes has to be detected via position sensors to be used by means of suitable processing to synchronize the data retrieval.

In common methods and devices for recording of digital data on an image-receiving medium the image recording occurs by means of a fast movement of a recording head along an image line, the so-called fast-scan axis, and by means of a slow movement of the image-receiving medium along the so-called slow-scan axis, which is orthogonal to the image line. The fast movement is typically provided by the rotation of an opto-mechanical assembly. The slow movement is typically provided by a continuous or step-wise movement of the image-receiving medium relative to the recording head or vice-versa. The size of the pixels as well as their positioning accuracy during recording of the digital data decisively determine the quality and resolution of the generated complete image. To obtain a resolution of e.g. 8000 dpi or 160 line pairs per millimeter, the recording head has to provide pixels with a diameter of 3 µm and write them with a position tolerance of typically 300 nm onto a perfect two-dimensional grid. For example, to achieve a resolution of 8000 dpi in a laser recorder when recording digital data on an image-receiving medium, the laser beam has to be focused exactly into the photosensitive layer to a full width at 1/e2 diameter of approximately 6 µm (corresponding to a full half value width of 3 µm). To pixels of an uniform size of 3 µm, the waist of the Laser beam has to be kept inside the photosensitive layer over the whole image area with tight tolerances; according to Rayleigh, in order to maintain a tolerance of the diameter of the pixels of 2%, the waist of the Gaussian laser beam must be maintained with approximately 10 µm accuracy within the photosensitive layer. Therefore, for a high resolution illumination, the image-receiving medium Is preferably sucked onto a support surface, e.g. onto the interior of a drum.

Further it must be observed that the movement of the recording head relative (or printing head) relative to the image-receiving medium will lead to a spreading of the applied light energy (the applied pixel) in case the exposure period for one pixel is not substantially shorter than the time it takes for the focused laser beam to move from one pixel position to the next along on the desired printing matrix along the fast-scan direction.

At a typical velocity of the Laser beam of 100 m/s along the fast-scan-direction a pixel distance of 3 µm is covered in 30 ns. In laser recording devices acousto-optical modulators are usually used, which deliver, at best, have rise and fall times of about 5 ns, which allows to reach shortest illumination intervals of approximately 15 ns. This illustration shows that the pixels on the photosensitive image-receiving medium are illuminated in circular manner only if the recording Laser beam in the illumination point has a suitable shape.

In a high resolution recording procedure with e.g. 8,000 dpi about 100,000 pixels are to be recorded of the length of a line of 300 mm, and in particular even the last pixel in each line must not have more than 300 nm positional deviation. Consequently, a relative positional tolerance of $10^{-6}$ (1 ppm, part per million) has to be maintained along the fast-scan direction. For known recording systems with a rotating recording head the speed of rotation can be kept constant with a tolerance of typically $5*10^{-5}$ (50 ppm) by means of a precise control of the drive. While the tolerance requirements for the velocity of the recording head along the slow-scan direction can be fulfilled by means according to prior art, there is a need for novel methods and devices for moving along the fast-scan direction.

SUMMARY OF THE INVENTION

One object of the invention is to describe a method for high-precision recording of digital data on image-receiving medium, which does not have or allows to eliminate the disadvantages, limitations and/or deficiencies of the prior art. A further object of the invention consists in providing an apparatus for carrying out the method.

These and other objects are achieved by the method and the apparatus as defined in the independent claims. Advantageous embodiments are described in the dependent claims.

The invention is based on the idea that, prior to recording the digital data to the image recording medium, the recording head is accelerated to a predefined speed or rotation number by a driving unit and then the drive is decoupled and/or switched-off while recording the digital data on the image-receiving medium. Only after writing a line or an image or part of it, the recording head is driven again and accelerated to the predefined speed in order to record the next line or the next partial or complete image. Hence, the recording head is idling (free-running) while imaging the data and therefore is only subject to attenuation as given by the system, which continuously but in determined manner reduces the velocity of the head along the fast-scan-direction. Advantageously, the recording head is provided with a large momentum of inertia such that the attenuation of the fast-scan movement of the idling recording head while recording the image data is small, e.g. so small that the speed of the recording head along the fast-scan-direction changes by less than ten percent during the recording of a line or a partial or complete image.

To prevent the pixels from being recorded with increasingly smaller distance on the image-receiving medium and the lines become shorter and shorter due to the decrease of the velocity of the recording head along the fast-scan-axis, the digital data can also be retrieved with a data rate that decreases in the same manner. A precise application of the image data onto the image recording medium is achieved by detecting and storing the passively damped motion behaviour of the idling recording head along the fast-scan direction by means of a sensor system prior and/or during the illumination and by deriving therefrom by suitable interpolation and/or extrapolation highly precise synchronisation signals for recording the image data. In the case of a continuous displacement along the slow-scan direction, a proportional reduction of the displacement speed of the recording head or the image recording medium allows to achieve that the line distance over the whole image width remains constant even though the data rate decreases or the time required for recording a single image line increases.

Hence, in the method according to the invention for recording digital data into the image recording medium by means of a recording head, the image recording medium and the recording head are driven and moved relatively to each other along a fast-scan direction, and the image recording medium and the recording head are driven and moved relatively to each other along a slow-scan direction. Digital image data are recorded to the image recording medium along the fast-scan direction. While recording the image data, the image recording medium and the recording head continue to move relatively to each other along the fast scan direction by means of inertia without being driven. The non-driven motion behaviour of the recording head relative to the image-receiving medium along the fast scan direction is detected prior and/or during the recording of the image data, and synchronisation signals for retrieving and recording the image data are derived therefrom.

Accordingly, the apparatus according to the invention for carrying out the method according to the invention comprises holding means for holding the image-receiving medium, an image data memory for storing the image data to be applied, and a recording head for recording the image data supplied from the image data memory onto the image-receiving medium, wherein the held image-receiving medium and the recording head are movable relatively to each other along a fast scan direction and along a slow-scan direction. The apparatus further comprises a fast-scan drive for driving the held image-receiving medium and the recording head relatively to each other along the fast-scan direction, a slow-scan drive for driving the held image-receiving medium and the recording head relatively to each other along the slow-scan direction, a fast-scan sensor for detecting the mutual position of the held image receiving medium and the recording head along the fast-scan direction, and a slow-scan sensor for detecting the mutual position of the held image material and the recording head along the slow-scan direction. The fast-scan drive can be decoupled from the held image receiving medium and/or from the recording head and/or can be switched off with regard to their driving effect. A control unit is provided connected to the fast-scan sensor, the slow-scan sensor, the fast-scan drive, the slow-scan drive and the image data memory for detecting the motion behaviour of the recording head relative to the image-receiving medium along the fast-scan direction and for deriving synchronization signals for recording the image data.

Advantageously, the damping behaviour of the fast-scan motion of the idling recording head is detected and stored prior to recording the image data. This can be achieved in simple manner, can be carried out once or several times depending on the requirements for the image resolution, and requires only minor computational capacity in the control unit because the feeding of the image data from the image memory for application to the image recording medium has not started yet.

Alternatively, the damping behaviour can also be detected while recording the image data. This has the advantage that a continuous adaptation can be made such that recent changes of the physical parameters of the system can be taken into account.

A particular advantage of the present invention lies in the fact that only one or a few start and/or position signals are required for deriving the control parameters for the highly precise application of the digital data onto the image-receiving material.

Advantageously, the behaviour of the fast-scan motion of the idling recording head is recorded in a control unit, processed and stored as a continuous ore finely graded series of clock frequencies for data retrieval.

Advantageously, the positional data of the recording head are detected by means of sensors systems. Such systems are small, light and easy to apply and can record the positional data with high accuracy.

The sensor systems are advantageously located on the recording head itself or are fixedly attributed to the same. For this purpose, such sensors can e.g. be applied on the rotational axis of the recording head or on a guide rail of the recording head. In a preferred embodiment the sensor system is arranged fixedly in respect to the recording head or the holder device for holding the image-receiving medium. In this way the positional value detected by the sensor system can directly be converted, without intermediary mechanics that would have to be adjusted and might lead to errors.

The sensor system can consist of at least one single sensor, which is applied to the recording head and can be moved with the same. In one possible embodiment the sensor system consists of at least one angle sensor, which is fixedly connected to a rotating recording head and guarantees an optimal detection of the angular position of the recording head. Alternatively, the system can also consist of a single sensor or a sensor array preferably fixedly connected to the holder device for receiving the image-receiving medium and parallel and/or perpendicular to an image line. In order to detect the positional data with sufficient accuracy, it is advantageously of the high resolution type.

In a further embodiment the sensor system consist of at least one periodic line grating and a light sensitive detector, which are arranged in such a manner that the laser beam generates a signal on the detector while running over the grating along the fast-scan direction, by means of which a current position and/or a current velocity of the recording head can be derived.

In a further embodiment the sensor system consists of at least one auxiliary laser, at least one auxiliary mirror on the movable recording head, and at least one light sensitive detector, which are arranged such that the laser beam generates a signal on the detector while traversing the auxiliary mirror along the fast-scan direction, by means of which a current position and/or a current rotational velocity of the recording head can be derived.

Advantageously the sensor system consists of at least two sensors, which can detect the positional data of the recording head along the fast-scan direction and/or along the slow-scan direction.

The application of a single pixel onto the image receiving medium occurs advantageously with such a speed that the motion of the recording head, in particular along the fast-scan direction, does not or only negligibly distort the round shape of the pixel applied to the medium, such that the resolution of the image in both axis direction is maintained.

Alternatively, the design of the recording head according to the invention the circular shape of the pixels on the image receiving medium can also be guaranteed for a fast motion of the recording head relative to the image receiving medium.

Advantageously, the pixel in the recording head has elliptic shape, i.e. smaller along the fast-scan direction and larger along the slow-scan direction, such that the pixel have circular shape after application to the image receiving medium.

The method of the invention is particularly suited for projecting digital data on a photosensitive image receiving medium in a laser recorder whose recording head comprises e.g. a rotating mirror system and optical means for focussing the laser beam onto the photosensitive image receiving medium, wherein the optical means are designed such that the laser beam has elliptical shape in the focus.

Advantageously, the laser beam is formed to be elliptical in its focus by suitable beam shaping and/or deflecting means, i.e. smaller along the fast-scan direction and larger as long the slow-scan direction.

Advantageously, the laser beams are coupled into singlemode waveguides by three lasers in the base colours red-green-blue (RGB) and fed, in flexible manner, to the rotatably mounted recording head. A preferred embodiment with a common waveguide for the three laser sources guarantees an optimum spatial over-lap of the pixels in the three base colours on the image receiving medium.

Advantageously, the beam shaping and/or deflecting means are designed such that, due to the movement of the recording head along the fast-scan direction, the optical transmission and/or reflection for the at least one laser beam is not influenced by these means independently on its polarization state.

Advantageously, at least one photosensitive sensor is arranged such that the at least one laser beam crosses the sensor before the movement of the recording head immediately before or after recording the image, and that at this occasion the optical power of the laser beam can be measured.

Advantageously, at least one optical element is placed in the beam path, preferably between the optical modulator and the deflection means mounted to the movable recording head, for changing the polarisation of the laser light, e.g. a quarter-wave plate or a depolariser.

Advantageously, at least one optical element is mounted on a micromechanical displacement unit, e.g. a Piezo actuator, and allows to very precisely adjust and readjust the focus of the laser beam on the image receiving medium to be illuminated. For example, a Piezo actuator can movable receive the end of the at least one waveguide.

Advantageously, the optical means for focussing the at least one laser beam are mounted to the movable recording head. This allows to use lens systems with small aperture and short focal length instead of telescopes with large aperture and large focal length for focussing the laser beam onto the image receiving medium.

The invention is particularly advantageously used in image generating devices where tapes are illuminated by means of a digital illumination system. In these devices a highly precise positioning of the digital image data on a photosensitive medium may be necessary, depending on requirements of the resolution. Similarly advantageously, the invention can be used in film copying devices. In such devices, modulatable light sources, such as lasers, light emitting diodes (LED) or such are used as illumination systems. Similarly advantageously, the invention can be used in other image generation devices, such as printers printing on the inside of a drum.

The term "direction" designates, in this document, not necessarily the direction of a straight line, but can also designate a rotational direction. This is in particular the case for the "fast-scan direction".

BRIEF DESCRIPTION OF THE DRAWINGS

Advantageous embodiments of the invention as well as other advantages, features, objects and possibilities of application of the same are described in the following description of the attached figures. In the figures the same reference numbers designate the same or corresponding elements. The figures show.

DETAILED DESCRIPTION OF THE INVENTION

Figure 1:
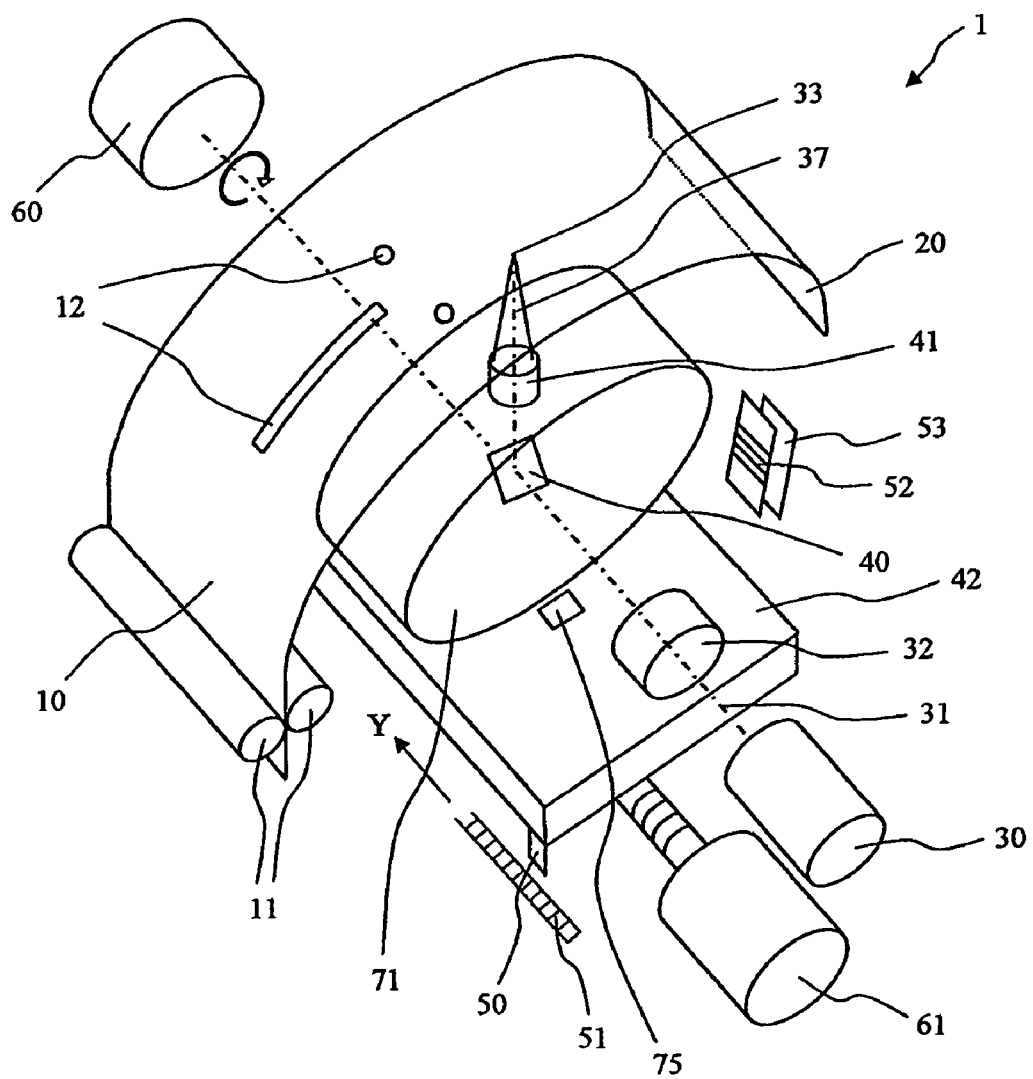
FIG. 1 a device according to the invention, namely the embodiment of an internal drum configuration for Laser recording for an image-receiving medium, FIG. 2 a device according to the invention, namely the embodiment based on a rotating polygonal mirror, FIG. 3 an embodiment of the recording head of the apparatus according to the invention, namely the example of a laser recorder for the image-receiving medium, FIG. 4 the process schematics for carrying out the method of the invention for recording digital data on an image-receiving medium, FIG. 5 diagrams of the temporal development of the velocity GX of the recording head along the fast-scan-direction for three embodiments of the method according to the invention, FIG. 6 diagrams of the temporal development of (a) the velocity GX of the recording head along the fast-scan-direction, (b) the clock frequency F for retrieving and writing the digital data on image-receiving medium and (c) the displacement velocity VY of the recording head or the image-receiving medium along the slow-scan-direction in the method according to the present invention, FIG. 7 an embodiment of a device according to the invention, namely the example of a laser writing device, FIG. 8 an embodiment of the recording head of the device according to the invention, namely the example of a laser writing device, FIG. 9 a further embodiment of the recording head of the device of the invention, namely the example of a laser writing device, and FIG. 10 a further embodiment of the recording head of the device of the invention, namely the example of a laser writing device.

FIG. 1 shows an embodiment of the invention in the example of an internal drum Laser recorder. Image-receiving medium 20 is first fed into the internal drum 10 by transporting elements 11 for recording and is then suitably held inside the drum 10 by e.g. a depressurizing device 12 during the recording process. A Laser 30 generates a Laser beam 31, whose power can be modulated directly or by a modulation unit 32, and which is led via rotary beam deflection elements 40 or a mirror, and/or beam shaping elements 41, e.g. a lens or lens system, into a focus 33 on the image receiving medium and generates an image line along a fast-scan-direction X. The beam deflection element 40 and/or beam shaping elements 41 are located on a rotary recording head 71, which is mounted on a translation stage 42 together with a fast-scan drive 60. The beam shaping elements 41 do not necessarily have to sit on recording head 71, but can also be located elsewhere between Laser 30 and the beam deflection element 40. A light sensitive sensor 75 is positioned on the linear stage 42 such that the Laser beam 37 from the rotating recording head 71 shortly illuminates the detector 75 before or after recording a line on the image-receiving medium 20. The fast-scan drive 60 can reversibly be decoupled from the recording head 71. The decoupling of the recording head 71 from the fast-scan drive 60 is reversible and can be carried out mechanically and/or electro-mechanically and/or electronically. An idling movement of the recording head 71 can also be accomplished in that control electronics 90 (cf. FIG. 4) for the drive system is switched appropriately. The translation stage 42 is movable along the slow-scan-direction Y by a slow-scan drive 61.

In the shown embodiment a sensor system 50-53 consists of a fast-scan sensor unit 52, 53 for detecting the movement of the recording head 71 or illuminated spot 33 along the fast-scan-direction X and of a slow-scan sensor unit 50, 51 for detecting the movement of the transport stage 42 or the illuminated spot 33 along the slow-scan-direction Y. Preferably, the fast-scan sensor unit consists of a periodic grating element 52 and an optical detector 53 and generates a start and/or synchronization signal for the recording of the digital data in an image line with the help of the passing focussed laser beam 33. The slow-scan sensor unit consists preferably of a ruler 51 along the slow-scan-direction Y and a sensor head 50 for detecting the current position or current velocity of the transport stage 42 along this direction Y.

According to the invention the recording head 71 is idling from the fast-scan drive 60 during the recording of image data and is moving in non-driven manner due to its momentum of inertia. In order to make this idling movement as continuous as possible, which is only influenced by damping, it can be preferable to design a recording head 71 with a large momentum of inertia. On the other hand, a recording head 71 of too high inertia can make the acceleration to an initial rotary velocity by the fast-scan drive 60 more difficult, which can be disadvantageous if the fast-scan drive 60 is switched on after one (cf. FIG. 5 (a)) or some few (cf. FIG. 5(b)) image lines. In practice, the momentum of inertia will be optimized in view of these and other aspects, as a person skilled in the art will be able to after knowledge of the invention.

Figure 2:
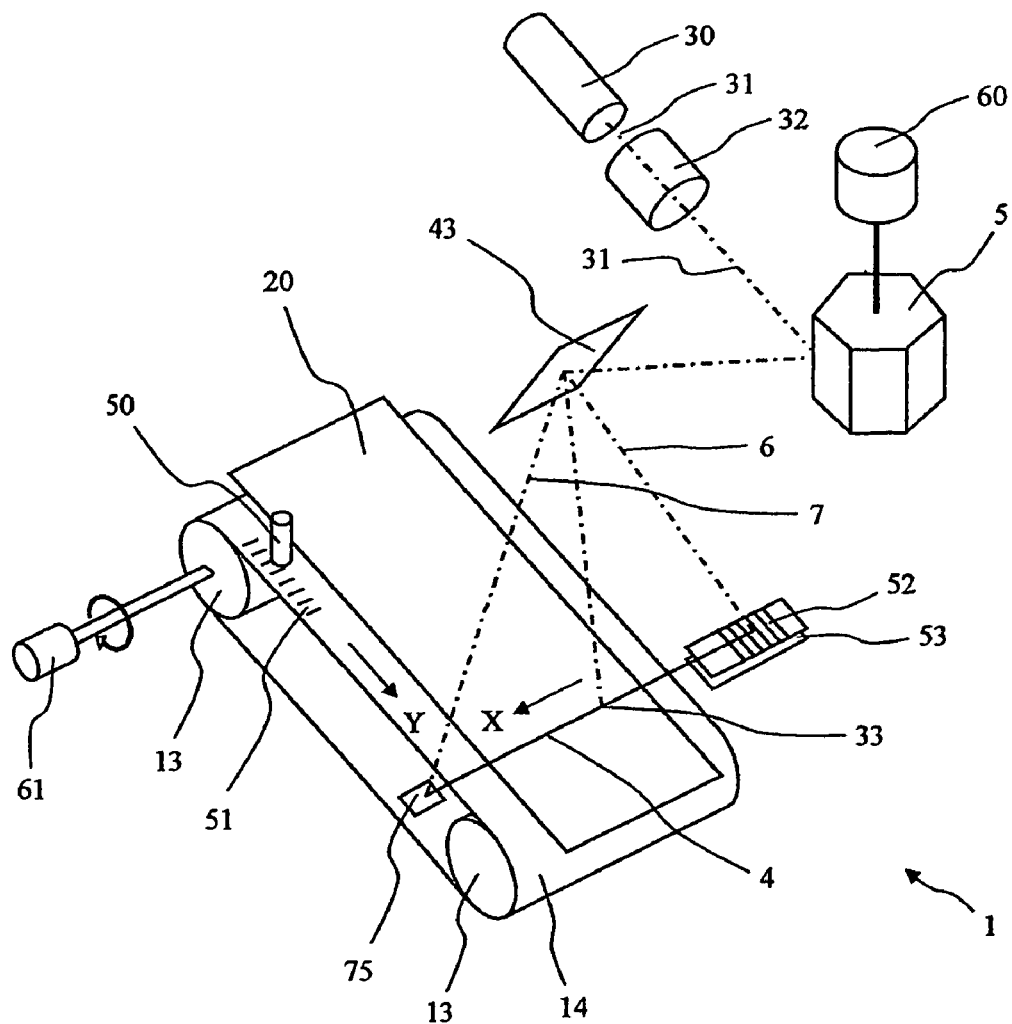

FIG. 2 illustrates an apparatus according to the invention in the embodiment of a Laser recorder. In contrast to FIG. 1, the image-receiving medium 20 is held in a plane, for example on a transport belt 14 between two transport rollers 13. A Laser 30 generates a Laser beam 31, the power of which can be modulated directly or by a modulation unit 32, and which is lead via a polygon mirror 5 and beam shaping and/or beam deflection element 43 into a focal spot 33 onto the image-receiving medium 20 for recording an image line 4 along the fast-scan-direction X. The image-receiving medium 20 is moved along the slow-scan-direction Y by transport means 13, 14. In this embodiment a sensor system 50-53 consists of a fast-scan sensor unit 52, 53 for detecting the movement of the focal spot 33 along the fast-scan-direction X and of a slow-scan sensor unit 50, 51 for detecting the movement of the image-receiving medium 20 along the slow-scan-direction Y. The fast-scan sensor unit 52, 53, which is mounted along the fast-scan-direction X but outside of the actual image line 4, consists preferably of a periodic grating 52 and an optical detector 53 and generates, with the help of the passing laser beam 6, a start- and/or synchronisation signal for the recording of the digital data along an image line 4. The slow-scan sensor unit consists preferably of a ruler 51 aligned along the slow-scan-direction Y and a sensor head 50 for detecting the position and movement of the image-receiving medium 20 along this direction Y. A light sensitive sensor 75 is positioned such that the Laser beam 7 deflected by the rotating polygon reflector 5 briefly illuminates the detector 75 before or after recording of an image line 4 on the image-receiving medium 20.

Figure 3:
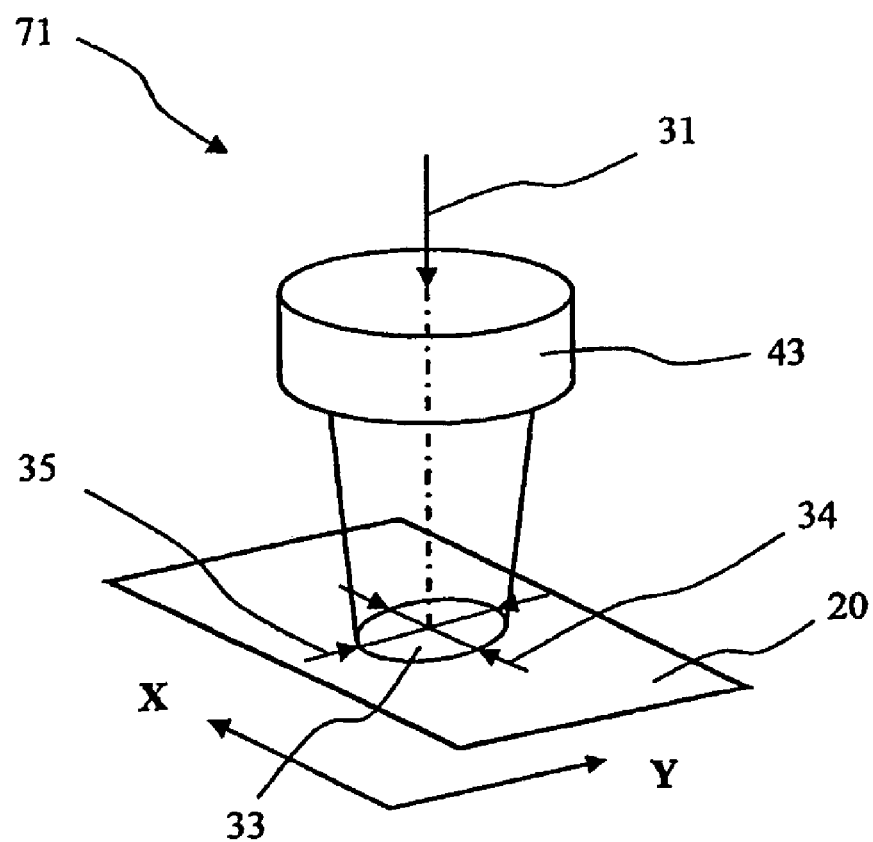

FIG. 3 shows an embodiment of a recording head 71 for carrying out the method of the invention in the example of Laser recorder. Beam shaping and/or beam deflection elements 43 steering an incident Laser beam 31 into an elliptical focal spot 33 onto the image-receiving medium 20 in such a way that a minor beam axis 34 is oriented along the fast-scan direction X and a major beam axis 35 is oriented along the slow-scan direction Y. This allows to achieve a circular shape of the illuminated image point even if the light spot 33 is moving at high speed along the fast-scan-direction X.

Figure 4:
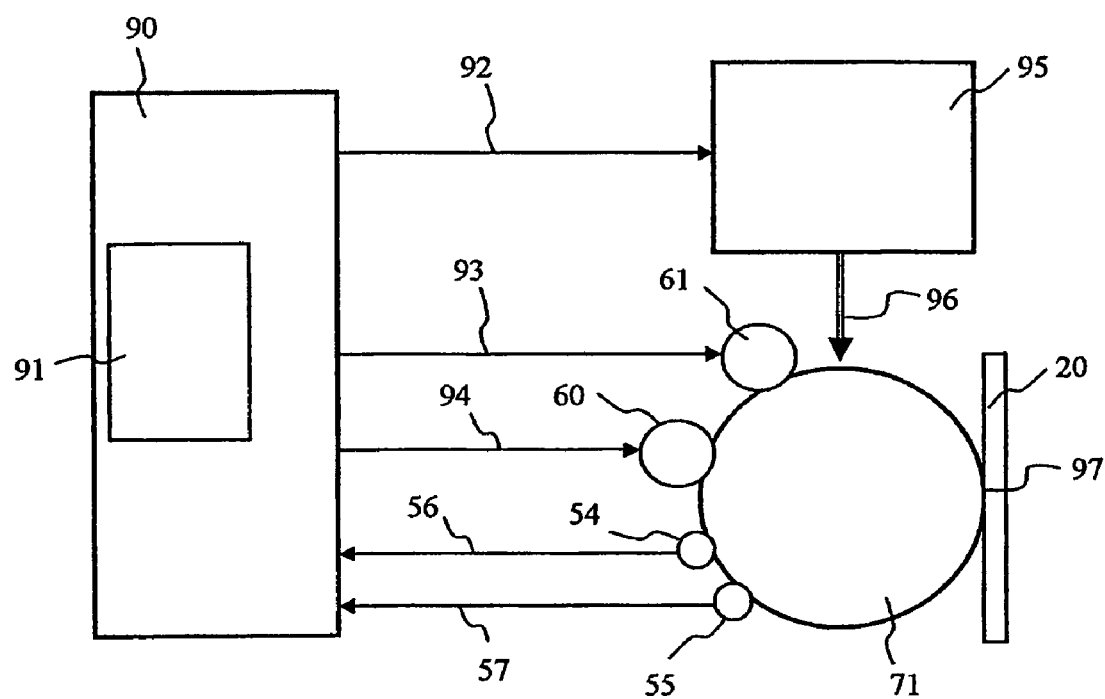

FIG. 4 shows process schematics for carrying out the method of the invention for recording digital data on image-receiving medium 20. A recording head 71 is moveably mounted and moved along a fast-scan-direction X and a slow-scan-direction Y over the image receiving medium by means of suitable driving systems 60, 61. A sensor system 54, 55 consisting of at least two sensor heads 54, 55, is detecting the positional data of the recording head 71 along the movement directions X, Y and sends corresponding signals 56, 57 to a control unit 90. Based on the current signals 56, 57 and/or on previously recorded signals stored in its memory 91, the control unit 90 generates appropriate start- and/or synchronization signals 92, 93, 94 and provides them to the image data memory 95 for retrieval 96 and recording 97 of the digital data to the image-receiving medium 20 as well as to the drives 60, 61 for movement of the recording head 71 along the two directions X and Y.

FIG. 5 shows three embodiments of the method of the invention, for each of which the velocity GX of the recording head 71 along the fast-scan-direction X is displayed as a function of time t.

Figure 5A:
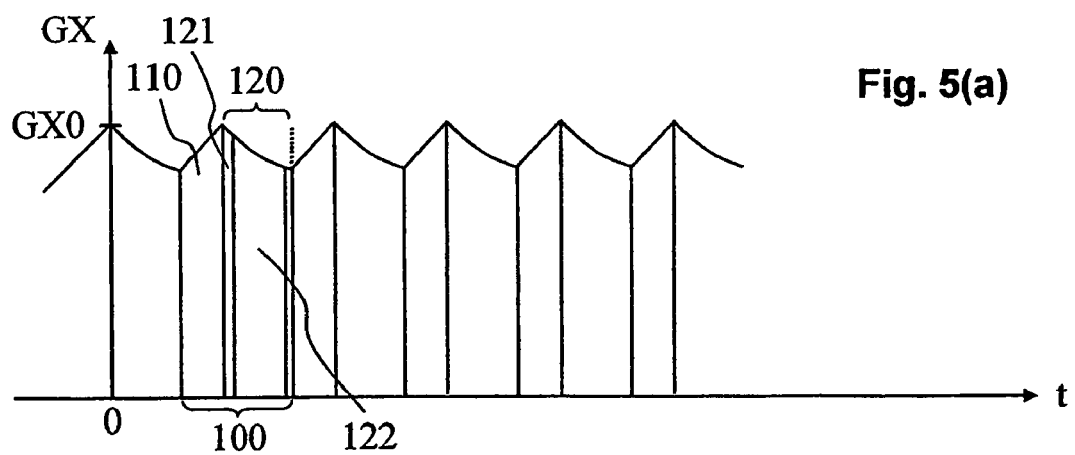

According to a first embodiment illustrated in FIG. 5(a) the velocity GX(t) exhibits "periodic" behaviour, a term which is not used in a mathematically strict sense due to the inevitable imperfections of the apparatus. Every period 100 consists of two phases: a phase of propulsion 110 and an idling phase 120, whereas the latter preferably includes a phase of measurement 121 and a phase of recording 122.

In a phase of propulsion 110 the recording head 71 is accelerated to a velocity GXO along the fast-scan-direction X by a drive 60. Thereafter, the recording head is decoupled from the drive and the idling phase 120 starts. A phase of measurement 121, during which the movement of the idling recording head 71 along the fast-scan-direction X is detected by a sensor unit 52, 53 and processed by a control unit 90, is preferably arranged within the idling phase 120. A phase of recording 122, during which the digital image data is recorded on the image-receiving medium 20, is also arranged within the idling phase 120. In practice, the phase of recording starts directly after a phase of measurement 121 in order to precisely set the beginning of the line, and ends somewhat earlier than the idling phase 120 itself. In the embodiment of FIG. 5(a) a single image line 4 is recorded during the phase of recording 122. Then there follows another period with a phase of propulsion and an idling phase, during which a single image line 4 is recorded, and so forth, until the whole image is recorded on the image-receiving medium 20.

In first approximation, the velocity GX(t) as a function of time t during the idling phase 120 can be expected to decrease exponentially:

$$GX(t)=GXO*\exp(-\delta*t) \quad (1)$$

for t within the idling phase, where $\delta > 0$ is a coefficient of attenuation. However, other more complex mathematical models might be also appropriate.

Figure 5B:
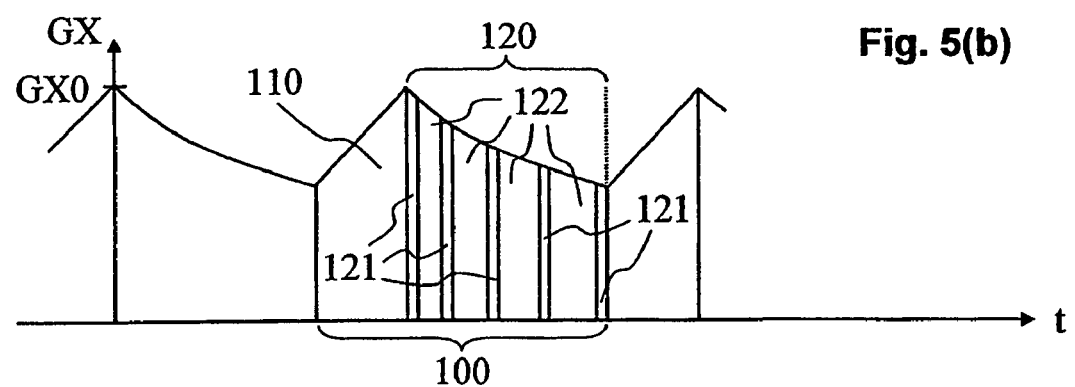

Also in a second embodiment illustrated in FIG. 5(b) the velocity GX(t) also exhibits "periodic" behaviour. In contrast to the first embodiment, through, several image lines 4 are consecutively recorded in several phases of recording 122 in one idling phase 20. In-between two phases of recording 122 there is at least one phase of measurement 121.

Figure 5C:
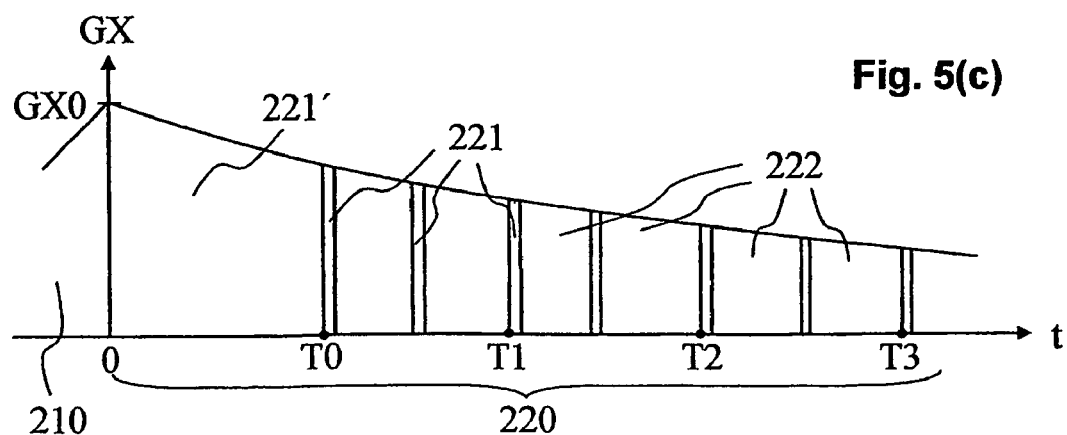

A third embodiment is illustrated in FIG. 5(c). Here, there is only one single phase of propulsion 210. In the following, single idling phase 220 a complete, self-contained data record, e.g. a complete image, is written line by line on the image-receiving medium 20.

In the embodiment illustrated in FIG. 5(c) a phase of measurement 221' precedes the first phase of recording 222. In the phase of measurement 221' the motion behaviour of the free-running, idling recording head 71 along the fast-scan-direction X is detected by the sensor system 52, 53 and processed by a control unit 90 (cf. FIG. 4). Depending on the resolution and accuracy of the sensor system 52, 53, the duration of the phase of measurement 221' and the total number of detected signals will be selected.

Such a separate phase of measurement 221' is however, not absolutely required. Alternatively, time periods T0, T1, T2, . . . required for recording a predefined number N (N=1, 2, . . . ) of image lines 4 can be detected with the sensor system 52, 53 during the idling phase 220. Based on these time periods T0, T1, T2, . . . it is possible to continuously determine and adapt the parameters that describe the movement of the recording head 71 during the idling phase 220 (according to simple case of equation 1 these parameters are GXO and δ). Mathematically speaking, the time periods T0, T1, T2, . . . represent a data set for a least square fitting of the curve GX(t). The use of mathematical models describing the velocity GX(t) of the recording head along the fast-scan-direction X in the idling phase offers, also here, the advantage that the clock for retrieving and recording of the digital data in-between two periods T(i) and T(i+1) can be extrapolated in arbitrarily finely graded manner.

In analogy to FIG. 5(b), phases of signal detection 221 might be interleaved by phases of recording 222.

Alternatively to a continuous adaptation due to current measured values, the system can be calibrated once for a longer time of use.

To determine the motion behaviour of the idling recording head 71 the behaviour of the velocity GX(t) is measured as a function of time t with the sensor system 52, 53. The measured data can either be used for the empirical determination of an appropriate mathematical model or can be stored in a look-up table. Depending on the required accuracy for the description of the behaviour of the velocity GX(t), a plurality of measurement values can be used for averaging such that statistical measurement errors of the sensor system 52, 53 can be made arbitrarily small.

The advantage of using mathematical models for the approximation of the behaviour GX(t) is, essentially, that independently of the resolution and accuracy of the sensor system 52, 53 intermediate values can be determined exactly by interpolation and e.g. stored in a table.

In FIG. 6 an embodiment of the synchronising process is illustrated for the method of the invention by means of a representation of (a) the velocity GXi of the recording head 71 along the fast-scan-direction X, (b) the clock frequency Fi Fi for retrieving 96 and writing 97 of the digital data on the image-receiving medium 20, and (c) the velocity VYi of the recording head 71 or of the image-receiving medium 20 along the slow-scan-direction Y as a function of time t.

The signals of the sensor system 52, 53 of the fast-scan direction X are recorded by means of control unit 90 e.g. in the phase of measuring 121 before and/or during the actual recording of the digital data on the image-receiving medium 20 during idling recording head 71 (cf. FIG. 5(c)). At a time T1>0 the phase of recording 122 and hence the recording of digital data on image-receiving medium 20 is started with a clock frequency F1. Based on the measured and/or stored velocity data of the idling recording head 71 along the fast-scan-direction X, the velocity GXi is highly precisely interpolated and/or extrapolated for any time Ti>T1 (FIG. 6(a)). From these values GXi the control unit 90 derives a continuous or finely graded series of clock frequencies $$Fi = F1 * GXi/GX1 \quad (2)$$

for the synchronization of the retrieval 96 of the digital data as indicated in FIG. 6(b).

Alternatively, for an appropriate selection of the momentum of inertia of the recording head 71 along the fast-scan-direction X and of the period 100 and of the idling phase 120, the clock frequencies Fi can be kept constant during recording an image line 4 or a partial image on the image-receiving medium 20, i.e. Fi=F1 for synchronising the retrieval of digital data during an idling phase 120.

The velocity of displacement of the recording head 71 along the slow-scan-direction Y is set to a desired velocity VY1, e.g. in the phase of measurement 121. The control unit 90 also generates a continuous or finely graded series of velocities $$VYi = VY1 * GXi/GX1 \quad (3)$$

for the drive of the recording head 71 along the slow-scan-direction Y during the phase of recording 122; see FIG. 6(c).

Alternatively, for an appropriate selection of the momentum of inertia of the recording head 71 along the fast-scan-direction X and of the period 100 and of the idling phase 120, the velocity of displacement VYi of the recording head 71 along the slow-scan-direction Y can be kept constant during recording an image line 4 or a partial image on the image-receiving medium 20, i.e. VYi=VY1 for synchronising the retrieval of the digital data during an idling phase 120.

After recording the digital data of an image line 4 or a partial or complete image, the recording head 71 is again driven along the fast-scan axis X and brought to a desired velocity GX0, in order to subsequently record the data for a next image line 4 or the next partial or complete image.

Figure 7:
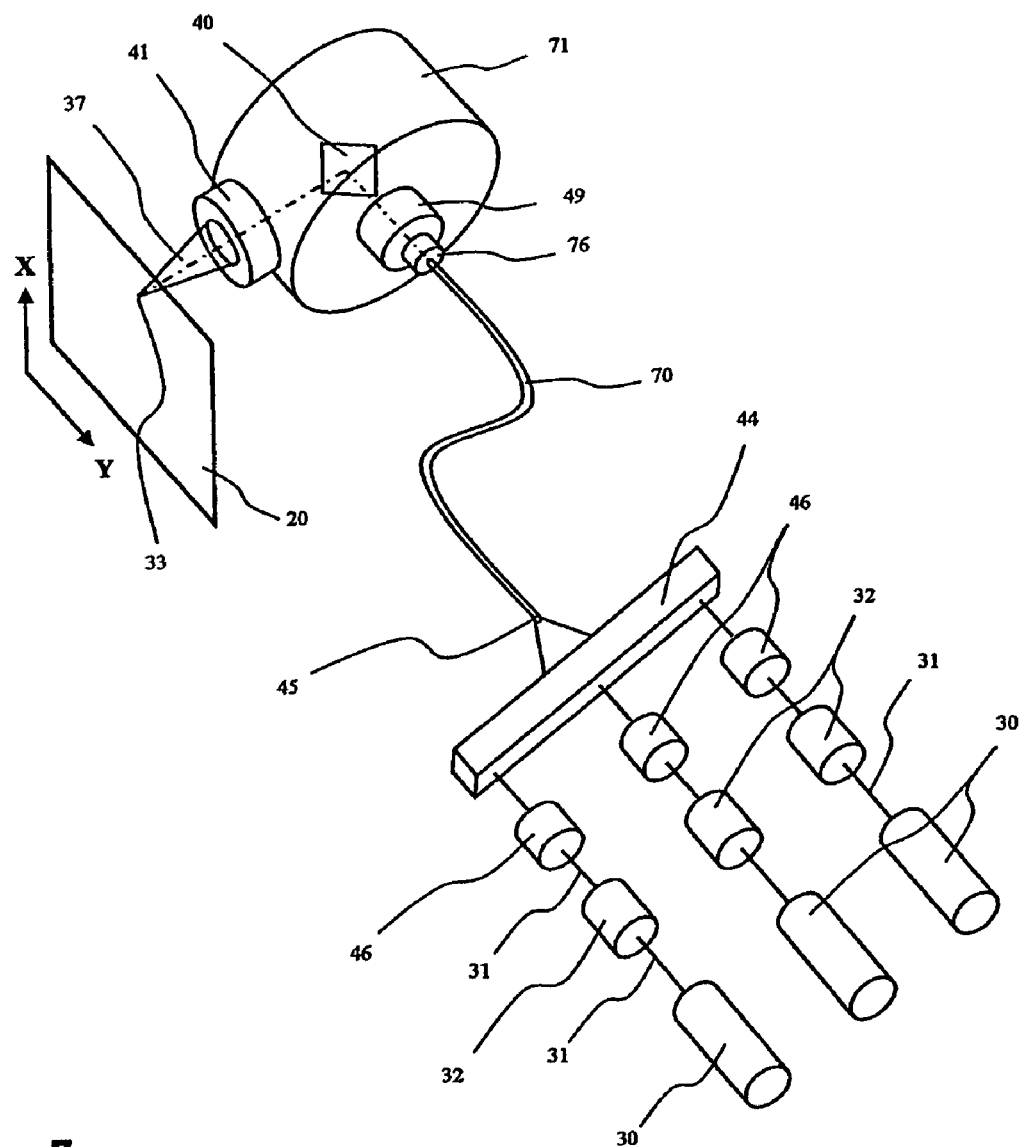

FIG. 7 shows an embodiment of the apparatus 1 of the invention in the example of a Laser recorder. Preferably one to three Laser units 30 generate one to three Laser beams 31 (e.g. RGB), the power of which can be varied directly in the laser units 30 or by means of external modulation units 32, which laser beams 31 are brought to one common focus 45 or three separate foci 45 by means of suitable beam guiding- and/or beam shaping elements 44 and can be coupled into one common or three separate single-mode light guides 70. The at least one single-mode light guide 70 provides a flexible beam delivery into a recording head 71 which is moveable along the fast-scan- and slow-scan-directions X and Y, respectively. The light from the at least one light guide 70 is brought to a focus 33 on the image-receiving medium 20 by means of deflection elements 40 and/or beam shaping elements 41, 49. Preferably, one to three optical elements 46 for transforming the polarization of the one to three Laser beams 31, e.g. wave plates or depolarisers, are inserted between modulator 32 and beam deflection element 40. Preferably, the end of the at least one light guide 70 is movably mounted on a micromechanical stage 76, e.g. a piezo element and allows, if a suitable design is used, to adjust the focus 33 of the laser beam 37 very precisely onto the image-receiving medium 20 to be illuminated and to automatically track it by using a suitable sensor system and feedback loop.

Figure 8:
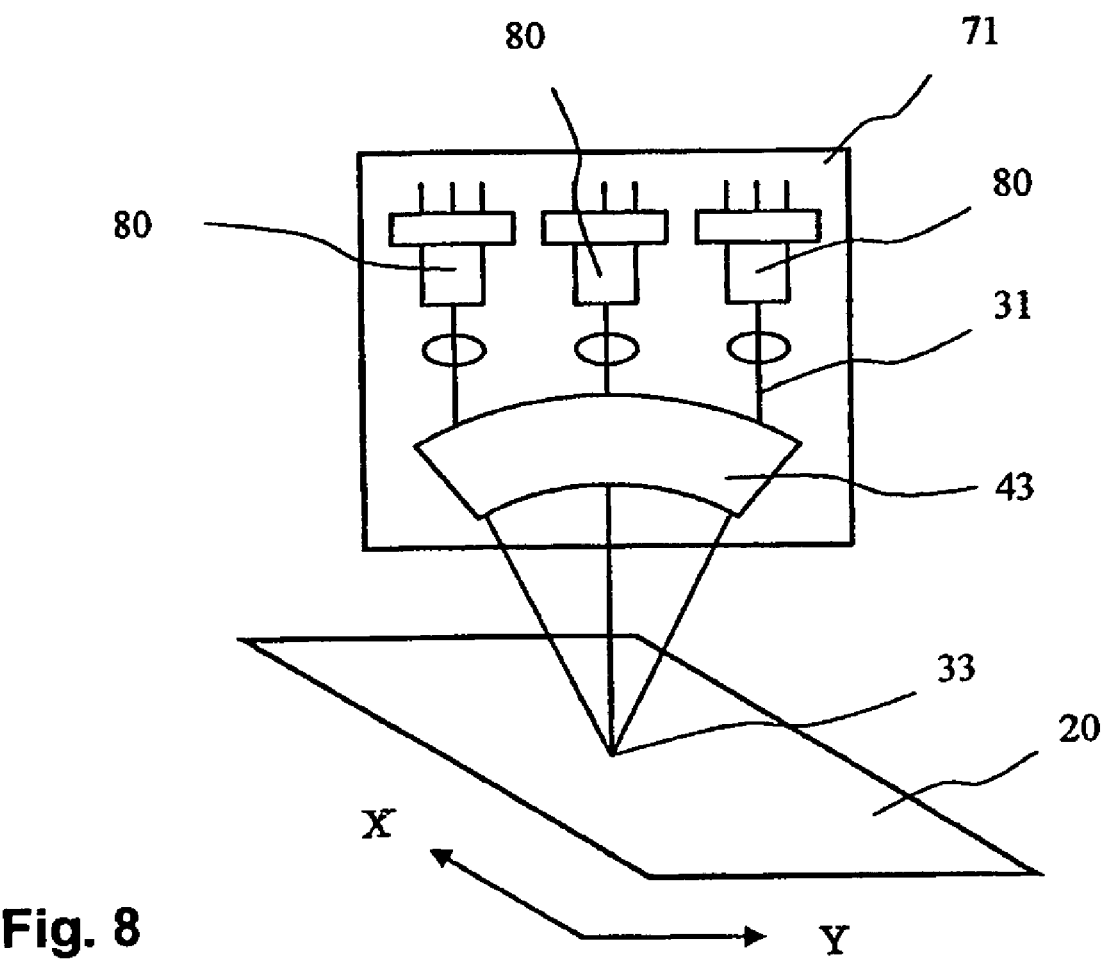

FIG. 8 shows an embodiment according to the invention of the recording head 71 of a Laser recorder for carrying out the method of the invention. Preferably one to three diode Lasers 80 are integrated in a recording head 71 which is moveable along two axis X and Y and generate one to three laser beams, the power of which can be modulated by means of direct control of the power of the laser diodes 80, and which can be focussed on an illumination spot 33 on the image-receiving medium 20 by means of suitable beam guiding- and/or beam shaping elements 44.

Figure 9:
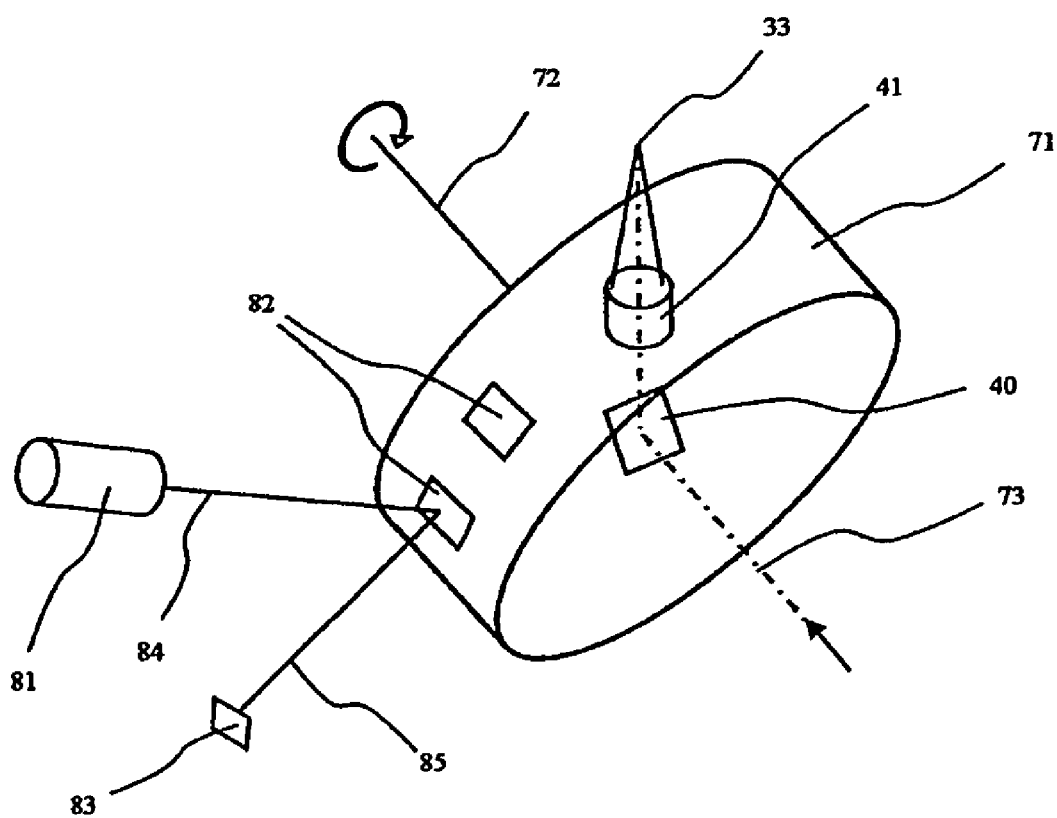

FIG. 9 illustrates a further embodiment according to the invention of the recording head 71 for carrying out the method of the invention. An auxiliary Laser 81 and a light sensitive detector 83 are mounted such that the laser beam 84 of the auxiliary laser 81 is reflected by at least one auxiliary mirror 892 mounted to the movable recording head 71 during the movement of the recording head 71 in such a manner that the light reflected laser beam 85 traverses the light sensitive detector 83 and generates thereby a start and/or positioning signal for synchronizing the retrieval 96 and recording 97 of the image data on the image-receiving medium 20.

Figure 10:
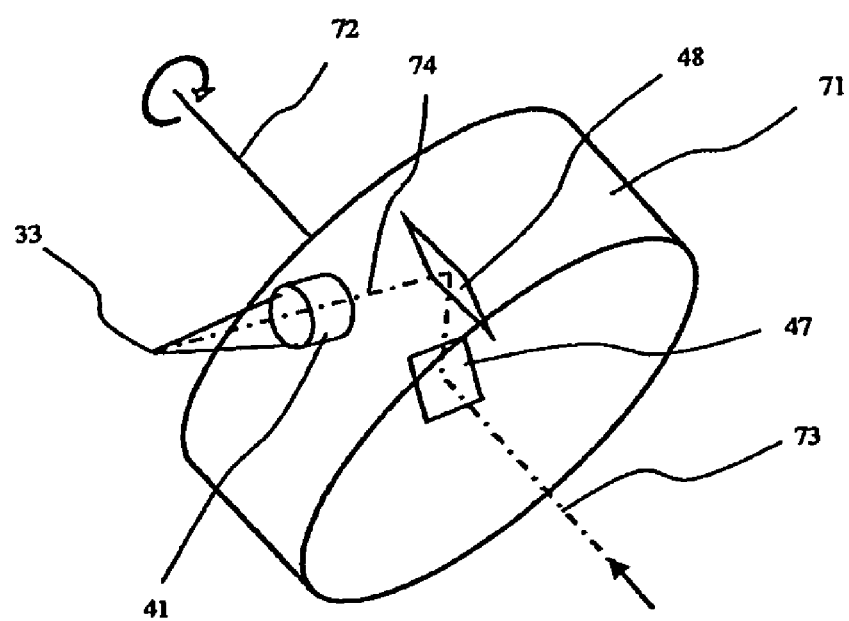

FIG. 10 illustrates an embodiment according to the invention of the deflection elements of the recording head 71 for carrying out the method of the invention in a Laser recorder. At least two beam deflection elements 47, 48 are arranged in the recording head 71 in such a manner that the laser beam 73 incident along the rotational axis 72 is deflected in such a way that the deflected laser beam 74 is orthogonal to the rotational axis 72 and to the laser beam 73 after passing the beam deflection elements 47, 48.

| Parts list: | |
|---|---|
| 1 | Apparatus |
| 4 | Image line |
| 5 | Polygon reflector |
| 6, 7 | Laser beam |
| 10 | Semi-cylindrical drum |
| 11 | Transport elements for image-receiving medium |
| 12 | Depressurising element for image-receiving medium |
| 13 | Transport rollers |
| 14 | Transport belt |
| 20 | Image-receiving medium |
| 30 | Laser |
| 31, 37 | Laser beam |
| 32 | Modulation unit |
| 33 | Focal spot |
| 34 | Minor beam axis |
| 35 | Major beam axis |
| 40 | Light deflection element |
| 41, 49 | Beam shaping elements |
| 42 | Translation stage |
| 43 | Beam shaping and/or beam deflection element |
| 44 | Beam guiding and/or beam shaping element |
| 45 | Focus |
| 46 | Optical element to change the polarization |
| 47, 48 | Beam deflection elements |
| 50 | Sensor head |
| 51 | Ruler |
| 52 | Grating element |
| 53 | Optical detector |
| 54, 55 | Sensor system |
| 56, 57 | Sensor signals |
| 60 | Fast-scan drive |
| 61 | Slow-scan drive |
| 70 | Single-mode light guide |
| 71 | Recording head |
| 72 | Rotational axis |
| 73, 74 | Laser beam |
| 75 | Photo detector |
| 76 | Micro-mechanical translation stage |
| 80 | Diode Laser |

| -continued | |
|---|---|
| Parts list: | |
| 81 | Auxiliary Laser |
| 82 | Auxiliary mirror |
| 83 | Optical sensor |
| 84, 85 | Laser beams |
| 90 | Control unit |
| 91 | Memory |
| 92-94 | Synchronization signals |
| 95 | Image data memory |
| 96 | Retrieval of image data |
| 97 | Recording of data on the image-receiving medium |
| 100 | Period |
| 110, 210 | Phase of propulsion |
| 120, 220 | Idling phase |
| 121, 221 | Phase of measurement |
| 122, 222 | Phase of recording |
| X | Fast-scan-direction |
| Y | Slow-scan-direction |
| GX | Velocity along the fast-scan-direction |
| VY | Velocity along the slow-scan-direction |
| F | Clock frequency |
| T, t | Time |

The invention claimed is:

1. A method for recording digital data on an image-receiving medium by means of a recording head, wherein the image-receiving medium and the recording head are driven and moved relatively to each other along a fast-scan direction, the image-receiving medium and the recording head are driven and moved relatively to each other along a slow-scan direction, and digital image data is recorded on the image-receiving medium, wherein while recording the image data the image-receiving medium and the recording head are moving on relatively to each other along the fast-scan direction, without being driven, by means of inertia, and a non-driven motion behaviour of the recording head relative to the image-receiving medium along the fast-scan direction is detected prior to and/or while recording of the image data, and synchronisation signals and a momentary clock frequency for retrieving and recording the image data are derived therefrom by suitable interpolation and/or extrapolation.

2. The method of claim 1 wherein the non-driven motion behaviour is detected by means of discrete measured values, and parameters for the interpolation and/or extrapolation of synchronization signals and a momentary clock frequency for retrieving and recording the image data are calculated.

3. The method of claim 1 wherein a momentary velocity of the image-receiving medium and the recording head relative to each other along the slow-scan direction is recorded from the detected motion behaviour of the recording head relative to the image-receiving medium.

4. The method of claim 1 wherein, prior to recording the image data, the image-receiving medium and the recording head are accelerated relatively to each other along the fast-scan direction to a desired velocity.

5. The method of claim 4, wherein a complete image data set is recorded on said image-receiving medium while the image-receiving medium and the printing head are being moved on along the fast-scan direction relatively to each other by means of inertia, without being driven.

6. The method of claim 4 wherein a complete image data set is recorded on said image-receiving medium by dividing the image data set into fractions, which encompass one or more image lines, the image data set fractions are recorded onto the image-receiving medium one after the other, while the image-receiving medium and the recording head are moved on relatively to each other along the fast-scan direction by means of inertia, without being driven, and the image-receiving medium and the recording head are being accelerated to a desired velocity between each two consecutive image data set fractions.

7. The method of claim 1 wherein, prior to recording the image data, the image-receiving medium and the recording head are accelerated relatively to each other along the slow-scan direction to a desired velocity.

8. The method of claim 1 wherein, between the recording of two consecutive image lines the image-receiving medium and the recording head are accelerated relatively to each other along the slow-scan direction to a desired velocity.

9. The method of claim 1 wherein between the recording of two consecutive image lines the image-receiving medium and the recording head are moved relatively to each other along the slow-scan direction by a given line spacing.

10. The method of claim 1 wherein the motion behaviour of the recording head is detected by a sensor system consisting of at least one light source.

11. The method of claim 1 wherein the image data are recorded on the image-receiving medium by means of light.

12. The method of claim 11, wherein the light is focussed in such a manner on the image-receiving medium that the diameter of the light spot on the image receiving medium in the fast-scan direction is smaller than in the slow-scan direction, such that substantially the same diameter of the image data point in the fast-scan direction and in the slow-scan direction results due to smearing along the fast-scan direction while recording of an image data point.

13. An apparatus for recording digital image data on an image-receiving medium comprising holding means for holding the image-receiving medium, an image data memory for storing the image data to be applied, a recording head for recording the image data supplied from the image data memory onto the image-receiving medium, wherein the held image-receiving medium and the recording head are movable relatively to each other along a fast-scan direction and along a slow-scan direction, a fast-scan drive for driving the held image-receiving medium mid the recording head relatively to each other along the fast-scan direction, a slow-scan drive for driving the held image-receiving medium and the recording head relatively to each other along the slow-scan direction, a fast-scan sensor for detecting the mutual position of the held image receiving medium and the recording head along the fast-scan direction, and a slow-scan sensor for detecting the mutual position of the held image medium and the recording head along the slow-scan direction, wherein the fast-scan drive can be decoupled from the held image-receiving medium and/or from the recording head and a control unit is provided connected to the fast-scan sensor, the slow-scan sensor, the fast-scan drive, the slow-scan drive and the image data memory for detecting a motion behaviour of the recording head relative to the image-receiving medium along the fast-scan direction and for deriving synchronization signals and a momentary clock frequency for retrieving and recording the image data.

14. The apparatus of claim 13 wherein the sensor system for detecting the movement of said recording head along said fast-scan-direction and/or slow-scan-direction comprises at least one light source.

15. The apparatus of claim 13 wherein said control unit comprises a memory for storing the detected motion behaviour of the recording head in respect to said image-receiving medium along said fast-scan-direction.

16. The apparatus of claim 13 wherein the holding means is designed as a drum on an inner surface of which the image-receiving medium can be attached, or as transport belt suspended between two transport rollers to which the image-receiving medium can be attached.

17. The apparatus of claim 13 wherein the fast-scan-sensor comprises a periodic grating or a periodic angle encoder and an optical detector.

18. The apparatus of any of claim 13 wherein the slow-scan-sensor comprises a ruler and a sensor head for reading the same.

19. The apparatus of claim 13 wherein the recording head is mounted rotatably.

20. The apparatus claim 19, wherein the apparatus comprises at least one photosensitive sensor usable for measuring the power of the at least one Laser beam.

21. The apparatus of claim 13 wherein the apparatus is a laser recorder, which comprises at least one laser light source, the power of the light of which can be modulated in response to the data stored in the image memory and can be led to the recording head.

22. The apparatus of claim 21 wherein said recording head comprises a rotary beam deflection unit.

23. The apparatus of claim 22 wherein said beam deflection unit comprises at least two beam deflection elements deflecting the incident Laser beam such that the deflected laser beam is orthogonal to the rotary axis.

24. The apparatus of claim 21 wherein the apparatus comprises beam shaping elements for focussing the light emitted by the at least one laser light source (30, 80) onto the image-receiving medium.

25. The apparatus of claim 24 wherein said beam shaping elements are partially or fully mounted on said movable recording head.

26. The apparatus of claim 13, wherein the apparatus comprises at least one optical element movably mounted on a micro-mechanical translation stage.

27. The apparatus of claim 26 wherein said micro-mechanical translation stage comprises at least one piezoelectric element.

28. The apparatus of claim 13 wherein the apparatus comprises at least one optical element usable to intentionally change the polarisation state of the Laser beam.

29. The apparatus of claim 28 wherein said at least one optical element for intentionally changing the polarisation state comprises an optical wave plate or an optical depolariser.

30. The apparatus of claim 21 wherein the apparatus comprises at least one single-mode light guide for guiding light from the at least one laser light source to said recording head.

31. The apparatus of claim 21 wherein the at least one laser light source is at least one laser diode and advantageously integrated in the recording head.

* * * * *